(12) United States Patent
Balgard et al.

(10) Patent No.: US 8,341,304 B2
(45) Date of Patent: Dec. 25, 2012

(54) FLEXIBLE INTELLIGENT ELECTRONIC DEVICE

(75) Inventors: Lennart Balgard, Arboga (SE);
Bernhard Deck, Weilheim (DE);
Krister Landernas, Vasteras (SE);
Tobias Gentzell, Vasteras (SE)

(73) Assignee: ABB Research Ltd. (CH)

( * ) Notice: Subject to any disclaimer, the term of this patent is extended or adjusted under 35 U.S.C. 154(b) by 179 days.

(21) Appl. No.: 12/977,997

(22) Filed: Dec. 23, 2010

(65) Prior Publication Data

US 2011/0157837 A1 Jun. 30, 2011

Related U.S. Application Data

(63) Continuation of application No. PCT/EP2009/057980, filed on Jun. 25, 2009.

(30) Foreign Application Priority Data

Jun. 25, 2008 (EP) ..................................... 08159005

(51) Int. Cl.
*G06F 3/00* (2006.01)
*G06F 13/12* (2006.01)
*G06F 9/00* (2006.01)

(52) U.S. Cl. .................... 710/8; 710/10; 710/62; 713/1; 713/2

(58) Field of Classification Search .......................... None
See application file for complete search history.

(56) References Cited

U.S. PATENT DOCUMENTS

| | | | |
|---|---|---|---|
| 6,944,662 B2 * | 9/2005 | Devine et al. ................. | 709/225 |
| 6,970,771 B1 | 11/2005 | Preiss et al. | |
| 7,020,501 B1 * | 3/2006 | Elliott et al. ................. | 455/574 |
| 7,191,076 B2 | 3/2007 | Huber et al. | |
| 2007/0057782 A1 * | 3/2007 | Wimmer ...................... | 340/531 |
| 2008/0209193 A1 * | 8/2008 | Zhang et al. ...................... | 713/1 |
| 2010/0204948 A1 * | 8/2010 | Kirrmann et al. ............. | 702/117 |
| 2010/0287363 A1 * | 11/2010 | Thorsen ............................ | 713/2 |

FOREIGN PATENT DOCUMENTS

DE 10307332 A1 9/2004

OTHER PUBLICATIONS

European Search Report; Application No. EP 08 15 9005; Dec. 17, 2008; 6 pages.
International Preliminary Report on Patentability and Written Opinion of the International Searching Authority; PCT/EP2009/057980; Jan. 5, 2011; 7 pages.
International Search Report; PCT/EP2009/057980; Sep. 25, 2009; 3 pages.

(Continued)

*Primary Examiner* — Henry Tsai
*Assistant Examiner* — Michael Sun
(74) *Attorney, Agent, or Firm* — St. Onge Steward Johnston & Reens LLC

(57) ABSTRACT

An intelligent electronic device for a Substation Automation or Distribution Automation system as well as to a method and computer program product for providing it. The device has a structuring of its own functionality according to a communication standard and includes mechanically separable, replaceable hardware modules interconnected via an intermodule bus. The modules implement functionality related to function related elements of the standard and include a communication module and I/O modules. The device includes elements of the communication standard comprising one device related element and replaceable function related elements of all the functions provided by the modules. The communication module includes the device related element and function elements associated with the function of the communication module as well as functions provided by all the I/O modules.

10 Claims, 3 Drawing Sheets

OTHER PUBLICATIONS

Kostic, et al.; "Understanding and Using the IEC 61850: A Case for Meta-Modelling"; Computer Standards & Interfaces 27 (2005) 679-695.

Apostolov, et al.; "Use of IEC 61850 Object Models for Power System Quality/Security Data Exchange"; Quality and Security of Electric Power Delivery Systems; 2003; 10 pages.

* cited by examiner

FLEXIBLE INTELLIGENT ELECTRONIC DEVICE

CROSS-REFERENCE TO RELATED APPLICATIONS

The present application is a continuation of pending International patent application PCT/EP2009/057980 filed on Jun. 25, 2009 which designates the United States and claims priority from European patent application 08159005.1 filed on Jun. 25, 2008, the content of which is incorporated herein by reference.

FIELD OF THE INVENTION

The present invention generally relates to the field of substation automation or distribution automation systems and more particularly towards an intelligent electronic device for provision in Substation Automation or Distribution Automation systems as well as to a method and computer program product for enabling selection of functions and hardware modules to be included in an intelligent electronic device.

BACKGROUND OF THE INVENTION

In order to enable communication between various devices in substation automation or distribution automation systems there has evolved a standard that enables communication between various devices of various device suppliers. This standard is IEC 61850. According to this standard software elements of equipment are hierarchically organized in a number of levels including a logical device level, a logical node level, a data object level and a data attribute level. A logical device here normally corresponds to a device in such a system, while a logical node corresponds to a function of the device, which data objects and data attributes relate to data of such a function. There may here be several logical nodes in a logical device for a number of various functions.

One type of device used in such systems is the intelligent electronic device (IED), which is used for monitoring and/or controlling other pieces of equipment in such systems, for instance equipment like circuit breakers and transformers. In order to perform this monitoring and control there are provided I/O (input/output) connections on the IED leading to such pieces of equipment. An intelligent electronic device can include a number of functions, where there may exist one logical node for each such function being implemented by the intelligent electronic device. In the above-mentioned standard there may for instance exist ninety-two different logical nodes together with the possibility to extensions.

Some logical nodes, like for instance CSWI, which is related to SWitch Control and Indication, has optional external data objects that need extra I/O connections if used.

Pieces of equipment connected to the I/O connections of an intelligent electronic device may furthermore vary depending on the environment in which the intelligent electronic device is provided.

Also the type of communication that an intelligent electronic device is to perform with other devices on a higher or the same level in the system may vary depending on the environment.

Finally there may in some instances be needed a variation of voltage levels used for operating an intelligent electronic device.

Some of these requirements could be met more easily if an intelligent electronic device were provided with modularized hardware, i.e. that an intelligent electronic device is provided with various separable and replaceable hardware modules that provide the functionality of the intelligent electronic device.

One way of providing modularized hardware for an intelligent electronic device is described in U.S. Pat. No. 7,191,076. Here there is an intelligent electronic device having a base module to which external function modules can be attached. These external function modules offer expandable features such as additional power management, additional communications, advanced communications, wireless communications, analog and digital input/output, data logging etc.

In view of what has been described above there would therefore be of interest to provide a modular IED, both regarding hardware and software, that can be combined with a data communication standard, like IEC 61850, in order to provide flexibility regarding both the software elements provided according to the communication standard and hardware modules for allowing a free combination of both software elements and hardware modules while at the same time providing communication according to the communication standard.

SUMMARY OF THE INVENTION

The present invention is generally directed towards providing an increased flexibility in the design of intelligent electronic devices.

One object of the present invention is therefore to provide an intelligent electronic device that is flexible both regarding hardware and software while following a data communication standard.

This object is according to a first aspect of the present invention solved through an intelligent electronic device for provision in Substation Automation or Distribution Automation systems and having a structuring of its own functionality according to a communication standard, which standard provides a series of elements hierarchically linked to each other and including a device related element, a number of function elements linked to the device related element and a number of data provision elements linked to the function elements, said device comprising:

mechanically separable, replaceable hardware modules interconnected via an inter-module bus, said modules implementing functionality related to the function related elements of the standard and including a communication module for communicating with other devices of the system via a computer communication network and at least one I/O module for direct communication with local system equipment, where said intelligent electronic device includes elements of the communication standard comprising one device related element and replaceable function related elements of all the functions provided by said modules, and where said communication module includes a control unit providing the device related element of the communication standard, function elements associated with the function of the communication module and at least one function element associated with functions provided by all the I/O modules.

Another object of the present invention is to provide a method for enabling selection of functions and hardware modules to be included in an intelligent electronic device, which provides an intelligent electronic device that is flexible both regarding hardware and software while following a data communication standard.

This object is according to a second aspect of the present invention solved through a method for enabling selection of functions and hardware modules to be included in an intelligent electronic device to be provided in a Substation Automation or Distribution Automation system and comprising the steps of:

receiving a user selection of functions to be included in the intelligent electronic device, receiving a user selection of data connections between the intelligent electronic device and local system equipment, and selecting mechanically separable, replaceable hardware modules to be included in the intelligent electronic device based on the received user selections, where the selected modules include a communication module for communicating with other devices of the system via a computer communication network and at least one I/O module for direct communication with local system equipment, where said communication module is provided for implementing functionality related to a communication standard, which standard provides a series of elements hierarchically linked to each other and including a device related element, a number of function elements linked to the device related element and a number of data provision elements, and where the selected communication module is configured to enable inclusion of the device related element of the communication standard, function elements associated with the function of the communication module and at least one function element associated with functions provided by all the I/O modules selected for the device.

Another object of the present invention is to provide a computer program product provided on a data carrier for enabling selection of functions and hardware modules to be included in an intelligent electronic device, which provides an intelligent electronic device that is flexible both regarding hardware and software while following a data communication standard.

This object is according to a third aspect of the present invention solved through a computer program product provided on a data carrier for enabling selection of functions and hardware modules to be included in an intelligent electronic device to be provided in a Substation Automation or Distribution Automation system, and comprising computer program code to make a computer perform, when said code is loaded into said computer receiving a user selection of functions to be included in the intelligent electronic device, receiving a user selection of data connections between the intelligent electronic device and local system equipment, and selecting mechanically separable, replaceable hardware modules to be included in the intelligent electronic device based on the received user selections, where the selected modules include a communication module for communicating with other devices of the system via a computer communication network and at least one I/O module for direct communication with local system equipment, where said communication module is provided for implementing functionality related to a communication standard, which standard provides a series of elements hierarchically linked to each other and including a device related element, a number of function elements linked to the device related element and a number of data provision elements, and where the selected communication module is configured to enable inclusion of the device related element of the communication standard, function elements associated with the function of the communication module and at least one function element associated with functions provided by all the I/O modules selected for the device.

The present invention has a number of advantages. It provides an intelligent electronic device that is flexible and which can be changed both regarding its hardware and its software. In this way it is possible to take account of such problems as provision of extra I/O connections for optional external data related elements of some function related elements, providing a device that may have a varying I/O connections depending on the environment in which it is provided and that is adaptable to various communication changes to higher level devices.

BRIEF DESCRIPTION OF THE DRAWINGS

The present invention will in the following be described with reference being made to the accompanying drawings, where FIG. 1 schematically shows a substation automation system including a number of devices at various hierarchical control and protection levels, of which one is an intelligent electronic device of the present invention.

DETAILED DESCRIPTION OF THE INVENTION

In the following, a detailed description of preferred embodiments of a device according to the present invention will be given.

Figure 1:
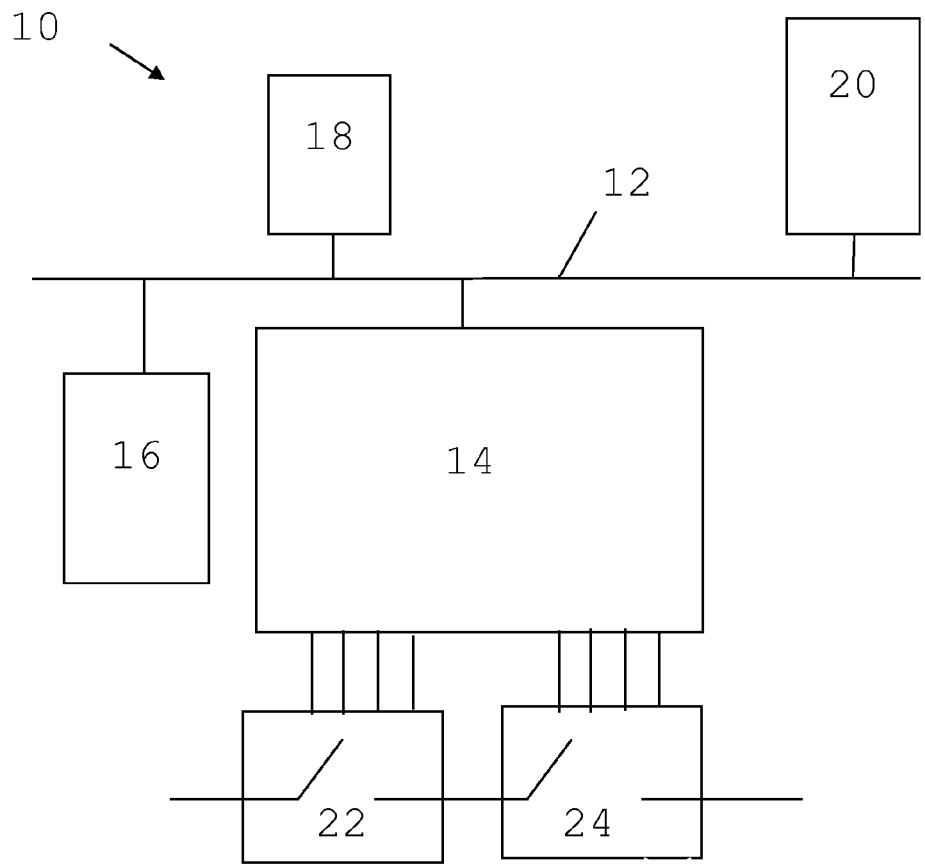

The present invention may be provided in a substation automation or distribution automation system. One such system 10 is schematically shown in FIG. 1. In FIG. 1 there are a number of devices connected to a computer communication network 12. There is here a first device 14, which is an intelligent electronic device (IED), a second device 16 that may be a further IED, a third device 18 that may be an HMI (human Machine Interface) and a fourth device 20 that may be a substation controller. Theses devices all communicate via the computer communication network 12 using the IEC 68150 communication protocol. The first device 14 is furthermore connected to a first and second piece of local equipment 22 and 24. These pieces of local equipment 22 and 24 may also be considered as process interface devices because they are interfaces to a process being controlled or monitored by the IED 14. This process is typically an electrical process, like an electrical power generation or transmission process or an electrical power supply process. In this regard the pieces of local equipment may be pieces of equipment such as circuit breakers and transformers. The pieces of local equipment 22 and 24 here have direct point-to-point connections to the IED. There is thus no communication over the computer communication network 12 for these devices 22 and 24. The first device 14 is here provided on one hierarchical protection and control level, while the second to fourth devices 16-20 are provided on the same hierarchical control and protection level as or a higher hierarchical control and protection level than the first device 14. The pieces of local equipment 22 and 24 are on the other hand provided on a lower hierarchical control and protection level than the first device 14.

Figure 2:
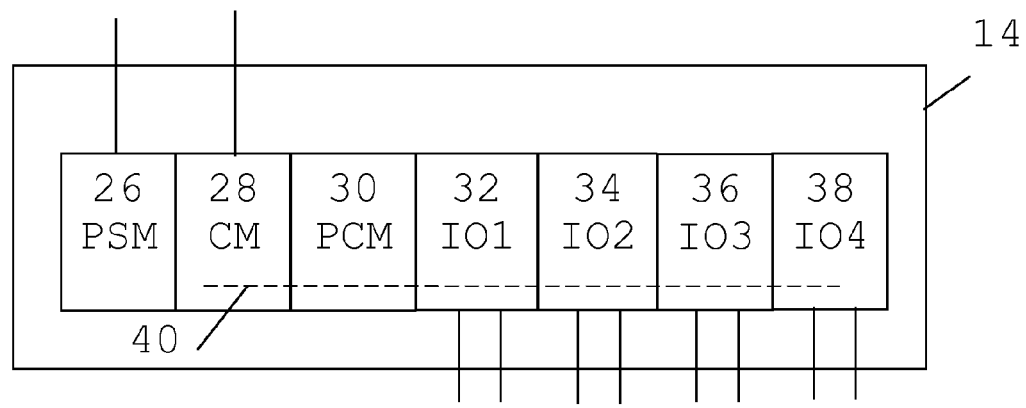
FIG. 2 shows a block schematic of an intelligent electronic device according to the present invention.

FIG. 2 shows a block schematic of the IED 14 according to the present invention. The IED 14 is a modular device. It is modular in that it includes a number of hardware modules 26, 28, 30, 32, 34, 36 and 38 providing separate functionalities of the IED 14. These hardware modules are replaceable and mechanically separable. This means that it is possible to vary the number and types of hardware modules in the IED 14. There is here a first hardware module 26, which is a power supply module PSM, which is connected to a power supply for receiving power for the whole IED 14 and for providing power to the rest of the modules in the IED. To this first module 26 there is connected a second module 28, which is a communication module CM. This communication module 28 is provided for communication with other devices over the computer communication network. The second module 28 is in turn connected to a third module 30, which is here a process control module PCM. This third module 30 includes processing functionality in the IED 14, for instance in relation to monitoring of one or more system conditions that may give rise to protective actions.

The third module 30 is here connected to a fourth module 32, which is a first I/O module IO1 that may be a first type of input module, for instance an input module handling analog input values. This is followed by a fifth module 34, which is here a second I/O module IO2 that may be a second type of input module, like one handling digital input values. This fifth module 34 is here followed by a sixth module 36, which is here a third I/O module IO3 that may be a first type of output module, for instance an output module handling analog output values. Finally there is a seventh module 38, which is here a fourth I/O module IO4 that may be a second type of output module, for instance one handling digital output values. The I/O modules 32, 34, 36, 38 are provided for direct communication with local system equipment and therefore here have direct point-to-point connections with the pieces of local system equipment in order to provide and receive data from these pieces of equipment, like the pieces of local system equipment in FIG. 1. There are normally a fixed number of such connections per I/O module. These are here being shown as two per I/O module. It should however be realized that this number may be varied and that this variation may also differ between different types of I/O modules.

The various modules, except for the power supply module 26, are furthermore interconnected by an inter-module data bus 40 (here shown as a dashed line). As the various modules are replaceable they can be provided in any position in the IED. There may also be more or fewer modules. However in the case of an IED that needs to communicate with other general protection devices, there is normally always a power supply module, a communication module and a process control module. Then there are as many I/O modules as are necessary for handling various I/O connections to pieces of local equipment in the system that the IED is connected to.

Figure 3:
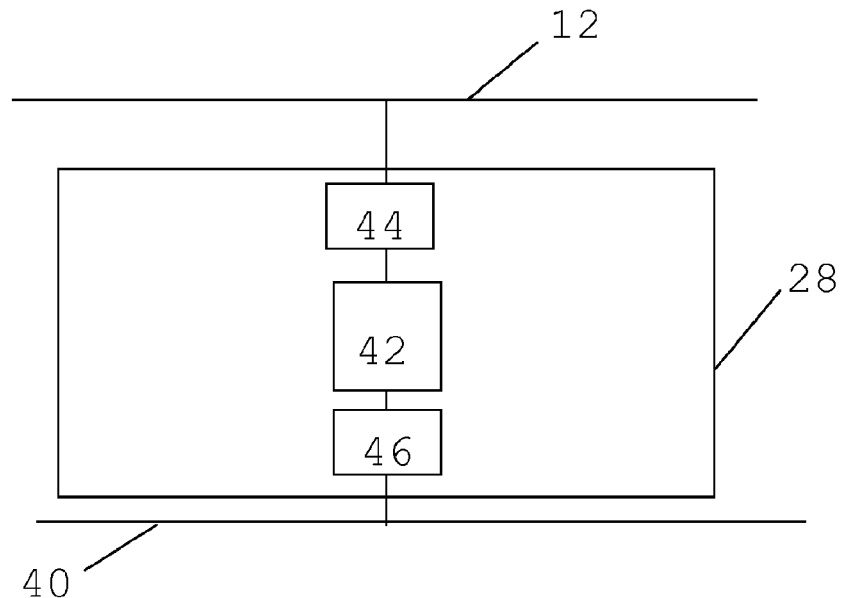
FIG. 3 shows a block schematic of a communication module in the intelligent electronic device of FIG. 2, FIG. 4 schematically shows the hierarchical structure of software elements according to the IEC 68150 standard, and FIG. 5 schematically shows a number of method steps taken by a PC tool for providing an intelligent electronic device according to the present invention.

The communication module 28 in the IED is shown in more detail in a block schematic provide in FIG. 3. The communication module 28 includes a control unit 42 providing functionality for controlling communication with the computer communication network 12 via a communication interface 44 as well as for communicating with the other modules via the inter-module bus 40 via a bus interface 46.

Figure 4:
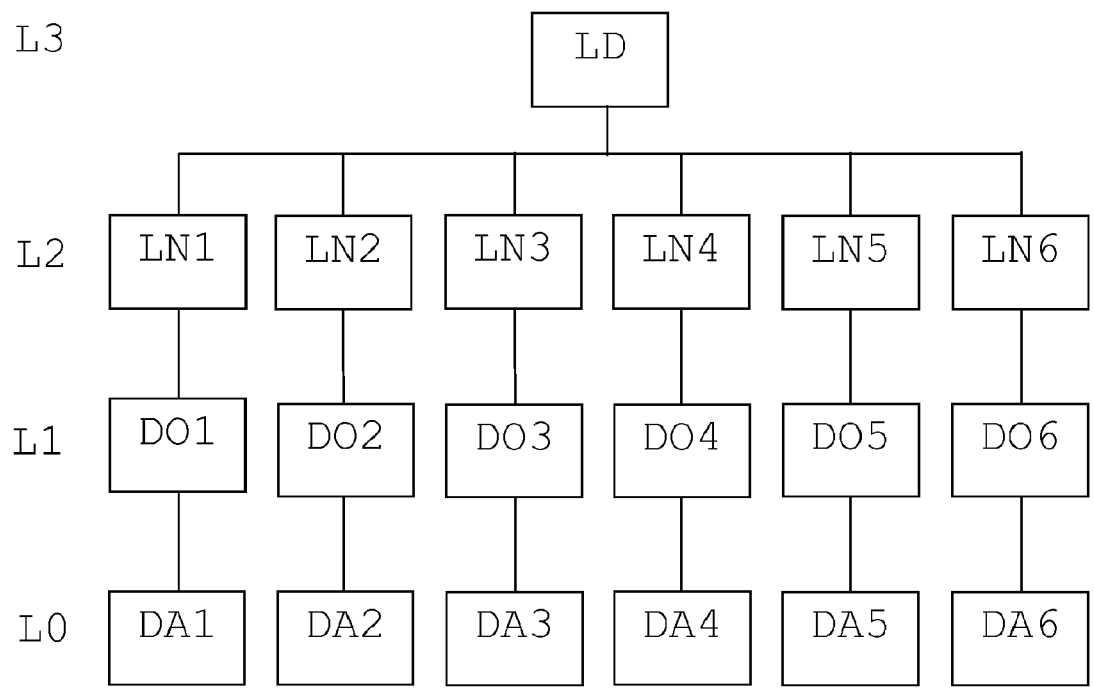

The IED in FIG. 2 has a structuring of its own functionality according to the IEC 61850 communication standard and also communicates over the computer communication network in accordance with this standard. FIG. 4 schematically shows a part of the hierarchical structure used by this standard, which is applicable on the IED in FIG. 2. According to the standard, the structure includes a series of elements hierarchically linked to each other. Here there are a number of first bottom elements DA1, DA2 and DA3, DA4, DA5 and DA6, where each is a data provision element provided on a first lowest level L0 and denoted data attribute DA, a second higher data provision element DO1, DO2, DO3, DO4, DO5 and DO6 associated with a respective data attribute DA is provided on a second higher level L1 and denoted data object DO, a third element on a third higher level L2 associated with a respective data object is termed a logical node LN1, LN2, LN3, LN4, LN5 and LN6. There is here a fourth element LD on a fourth higher level L3 that is termed a logical device and which is associated with or linked to each logical node LN1, LN2, LN3, LN4, LN5 and LN6, while each logical node is associated with or linked to a corresponding data object DO, which in turn is connected or linked to a corresponding data attribute DA. The logical device LD is here a device related element in that it is related to the IED, while a logical node is a function element in that it is related to a function of the IED. In this way the structure in FIG. 4 provides one logical device that is connected to six logical nodes, where each logical node is connected to a data object, which in turn is connected to a data attribute.

Now there will follow an exemplifying description of the structure in FIG. 4 to the modules in FIG. 2. A first logical node LN1, a first corresponding data object DO1 and a first corresponding data attribute DA1 are all here associated with a communication function provided by the communication module. A second logical node LN2, a second corresponding data object DO2 and a second corresponding data attribute DA2 are all here associated with a protection or control function provided by the process control module. A third logical node LN3, a third corresponding data object DO3 and a third corresponding data attribute DA3 are all here associated with a function provided by the first I/O module. A fourth logical node LN4, a fourth corresponding data object DO4 and a fourth corresponding data attribute DA4 are all here associated with a function provided by the second I/O module. A fifth logical node LN5, a fifth corresponding data object DO5 and a fifth corresponding data attribute DA5 are all here associated with a function provided by the third I/O module. Finally a sixth logical node LN6, a sixth corresponding data object DO6 and a sixth corresponding data attribute DA6 are all here associated with a function provided by the fourth I/O module.

It should here be realized that the structure in FIG. 4 is greatly simplified. There may therefore be more logical nodes, that there may be more than one data object associated with a logical node as well as more than one data attribute associated with a data object. The data object and data attribute elements furthermore allow nested elements. This means that an element on one level may include one or more other elements on the same level.

To the structure in FIG. 4 further elements may be added. There may be further elements on a fifth higher level termed a server, on a sixth higher level termed Access Point and on a seventh highest level termed an IED. A logical device LD, can here be seen as the IED itself or to correspond to the collection of the various functions in the device, i.e. in the IED, a logical node LN corresponds to one specific function of this logical device, while a data object DO corresponds to data associated with the function and the data attribute DA corresponds to an attribute of such data. An attribute may here be such diverse things as an indication of analog or digital data, an indication of if the data is control data or status data and data value range. An attribute may furthermore indicate other relations to a data object, such as if there should be a time stamp provided.

According to the principles of the present invention the hardware modules implement functionality related to the function related elements of the standard, i.e. to the logical nodes. For this reason the logical device element LD is provided as software in the communication module 28 of the IED 14 and then in the control unit 42 of this communication module 28. The logical node LN1 implementing the communication function as well as the corresponding data object DO1 and data attribute DA1 are here also provided as software in the control unit 42 of the communication module 28 as are the logical nodes LN3, LN4, LN5 and LN6 of all I/O modules. The control unit 42 of the communication module 28 may also include a logical node LLN0, which is a node that specifies characteristics of the IED and a logical node LPHD (Logical Node for Physical Device) that describes common properties of the IED. These nodes would then be provided together with corresponding data objects and data attributes. Here also the data objects DO3, DO4, DO5 and DO6 of the I/O modules 32, 34, 36 and 38 are provided as software in the control unit 42 of the communication module 28. However the corresponding data attributes DA3, DA4, DA5, and DA6 are provided in the respective I/O modules 32, 34, 36 and 38. If a logical node associated with the power supply module 26 is provided, this may here be provided in the communication module 28 as well. The logical node LN2 and the associated data object DO2 and data attribute DA2 associated with the process control module may also be provided in the communication module 28 or alternatively in the process control module 30.

The control unit 42 of the communication module 28 may here be arranged to associate the data attributes DA3, DA4, DA5, DA6 of the I/O modules 32, 34, 36, 38 with the logical nodes LN3, LN4, LN5, LN6 for these I/O modules via the inter-module bus at powering up of the device, i.e. when the power supply module 26 first supplies power to the other modules.

Through this way of providing an IED the communication module is the main module for handling the elements according to the communication standard, which the other modules will depend on for communication. The communication module will then include all the logical nodes needed for the IED at least regarding communication in the computer communication network and regarding communication with pieces of local equipment. The control unit of this module may thus includes an association between a data object of a logical node provided for an I/O module to the corresponding attribute, which attribute may be provided as software in the I/O module. The logical nodes and associated data objects and data attributes in the control unit are furthermore replaceable in that some or all of them can be deleted and others may be added.

In this way there is provided an IED that is flexible and which can be changed both regarding its hardware through adding and/or removing hardware modules, but also regarding software through adding or removing logical nodes associated with the device. A greater flexibility is thus provided, which can take account of such problems as provision of extra I/O connections for optional external data objects of some logical nodes, like for instance CSWI, providing an IED that may have a varying amount and types of I/O connections depending on the environment in which it is provided, that is adaptable regarding providing various auxiliary voltage levels and that is adaptable to various communication changes to higher level device such as station controllers, where these variations may be based on technology, protocol, data rate, media, connectors, topology and redundancy.

The control unit of the communication module may be provided in the form of a processor with corresponding program memory including computer program code for performing its functionality.

Figure 5:
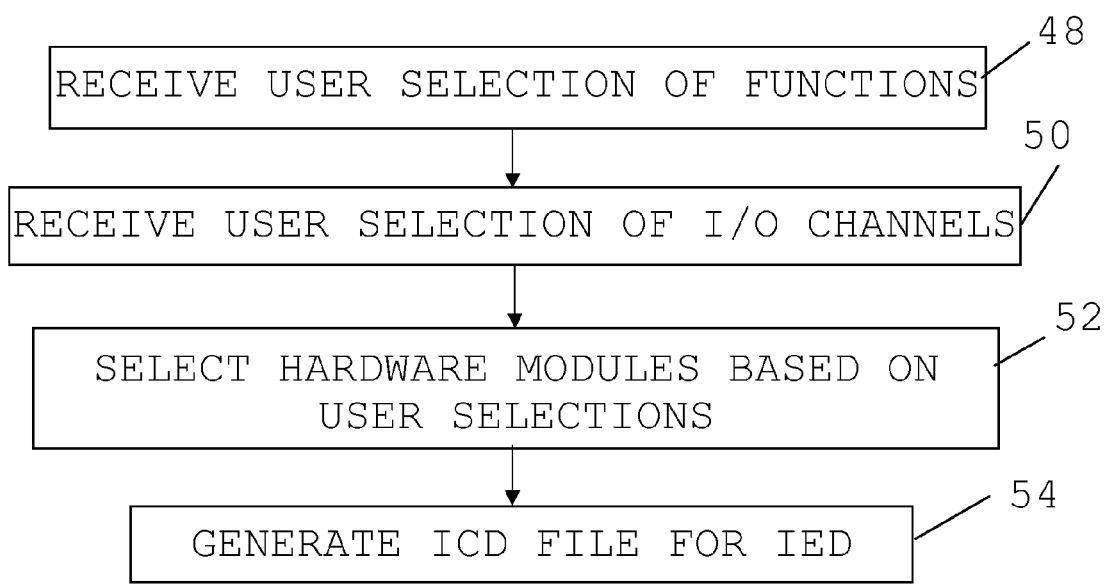

In order to provide guidance about how an IED should be put together a PC tool may be used. This PC tool thus provides guidance regarding which software and hardware modules are to be included in an IED. The functioning of such a PC tool, when being provided in a computer, will now be given with reference being made to FIG. 5, which shows a number of method steps being performed by this PC tool. Here a user may be allowed to select functions to be included. This selection may here involve a direct selection of logical nodes. The user may also be allowed to make selections regarding lower hierarchical control and protection levels, such as to select the types and number of data channels that are provided by pieces of local equipment with which the IED is to communicate The user may also make selections regarding the communication environment with other devices on the same or higher hierarchical control and protection levels. The PC tool does thus receive user inputs regarding functions to be included in the IED, step 48, as well as user inputs regarding I/O channels to be used, i.e. regarding number and types of data connections to local system equipment, step 50. These selections may thus be accompanied by selections regarding the communication environment to a higher or within the same control and protection level. The PC tool then selects which mechanically separable and replaceable modules are to be included in the IED out of a number possible modules based on the user selections, step 52. If for instance control and/or monitoring functions are selected one or more processing modules that can handle these control and/or monitoring functions are selected. A suitable number of I/O modules of various types that can handle the various I/O channels are then selected based on the user I/O channel selections. A communication module able to communicate with higher hierarchical levels as well as with the I/O and process control modules is then selected by the PC tool. One or more power supply modules for handling the various voltage levels of the other modules may here also be selected. The selection of modules may here be the modules that are depicted in FIG. 2.

In these selections a communication module provided for communication with other devices via a computer communication network is always selected. The selected communication module is provided for implementing functionality related to a communication standard, here IEC 61850 and is configured to enable inclusion of the logical device, one or more logical nodes associated with the function of the communication module and logical nodes associated with functions provided by all the selected I/O modules. Here the selected I/O modules do include various data attributes, while the communication module is provided with functionality for associating data attributes of I/O modules with data objects that are to be provided in the communication module. These various selected modules may then be combined into an IED. The PC tool may here also generate an ICD (IED Capability Description) file, step 54, through investigating the functions and modules selected and select logical nodes, data objects and data attributes that correspond to these functions and modules. This ICD file may then be provided in or in relation to the communication module. The ICD file may thereafter be used in relation to configuring the IED for communication according to the IEC 61850 standard. An ICD file is here a file, which may be provided in the form of an XML file, describing the functionality of the IED in terms of the elements of the IEC 61850 communication standard. It thus includes a description of a logical device, logical nodes, data objects and data attributes supported by the IED.

The PC tool may be provided as a computer program product provided on a data carrier and comprising computer program code to make a computer perform the above-described functionality, when said code is loaded into a computer. The data carrier may be a portable carrier like a CD Rom disc or a memory stick, but may also be a memory in a computer.

There are a number of possible variations that can be made to the present invention apart form those already mentioned. The I/O modules may for instance include the corresponding data objects in addition to the data attributes.

From the foregoing discussion it is evident that the present invention can be varied in a multitude of ways. It shall consequently be realized that the present invention is only to be limited by the following claims.

What is claimed is:

1. An intelligent electronic device for provision in Substation Automation or Distribution Automation systems and having a structuring of its own functionality according to a communication standard, which standard provides a series of elements (LD, LN1, LN2, LN3, LN4, LN5, LN6, DO1, DO2, DO3, DO4, DO5, DO6, DA1, DA2, DA3, DA4, DA5, DA6) hierarchically linked to each other and including a device related element (LD), a number of function elements (LN1, LN2, LN3, LN4, LN5, LN6) linked to the device related element (LN) and a number of data provision elements (DO1, DO2, DO3, DO4, DO5, DO6, DA1, DA2, DA3, DA4, DA5, DA6) linked to the function elements, characterized in that the device comprises:

mechanically separable, replaceable hardware modules interconnected via an inter-module bus said modules implementing functionality related to the function related elements (LN1, LN2, LN3, LN4, LN5, LN6) of the standard and including a communication module for communicating with other devices of the system via a computer communication network and at least one I/O module for direct communication with local system equipment, where said intelligent electronic device includes elements of the communication standard comprising one device related element (LD) and replaceable function related elements (LN1, LN2, LN3, LN4, LN5, LN6) of all the functions provided by said modules, and where said communication module includes a control unit providing the device related element (LN) of the communication standard, function elements (LN1) associated with the function of the communication module and at least one function element (LN3, LN4, LN5, LN6) associated with functions provided by all the I/O modules, all I/O modules providing data related functions include data provision elements (DA3, DA4, DA5, DA6) according to the standard and being associated with a corresponding function element (LN3, LN4, LN5, LN6) in the communication module, the I/O modules provide the data related elements at the lowest hierarchical level of the linked elements providing attributes of data defined by a corresponding higher level data provision element (DO3, DO4, DO5, DO6), said higher level data provision element and corresponding function related element (LN3, LN4, LN5, LN6) are provided by the communication module and the control unit of the communication module is arranged to associate, at powering up of the device, the data provision elements (DA3, DA4, DA5, DA6) of the I/O modules with corresponding elements (LN3, LN4, LN5, LN6) associated with the function of the I/O modules in the communication module.

2. The device according to claim 1 further comprising a process control module for handling at least one protection and control function of the device.

3. The device according to claim 1, further comprising a power supply module providing power to the other modules of the device.

4. The device according to claim 1, wherein the communication standard is IEC 61850.

5. A method for enabling selection of functions and hardware modules to be included in an intelligent electronic device to be provided in a Substation Automation or Distribution Automation system and comprising the steps of:

receiving a user selection of functions to be included in the intelligent electronic device, and receiving a user selection of data connections between the intelligent electronic device and local system equipment, characterized by the further step of selecting mechanically separable, replaceable hardware modules to be included in the intelligent electronic device based on the received user selections, where the selected modules include a communication module for communicating with other devices of the system via a computer communication network and at least one I/O module for direct communication with local system equipment, where said communication module is provided for implementing functionality related to a communication standard, which standard provides a series of elements (LD, LN1, LN2, LN3, LN4, LN5, LN6, DO1, DO2, DO3, DO4, DO5, DO6, DA1, DA2, DA3, DA4, DA5, DA6) hierarchically linked to each other and including a device related element (LD), a number of function elements (LN1, LN2, LN3, LN4, LN5, LN6) linked to the device related element (LD) and a number of data provision elements (DO1, DO2, DO3, DO4, DO5, DO6, DA1, DA2, DA3, DA4, DA5, DA6), where the selected communication module is configured to enable inclusion of the device related element (LD) of the communication standard, function elements (LN1) associated with the function of the communication module and at least one function element (LN3, LN4, LN5, LN6) associated with functions provided by all the I/O modules selected for the device, where all selected I/O modules include data provision elements (DA3, DA4, DA5, DA6) according to the standard, where the I/O modules provide the data related elements (DA3, DA4, DA5, DA6) at the lowest hierarchical level of the linked elements providing attributes of data defined by a corresponding higher level data provision element (DO3, DO4, DO5, DO6), and all I/O modules providing data related functions include data provision elements (DA3, DA4, DA5, DA6) according to the standard and being associated with a corresponding function element (LN3, LN4, LN5, LN6) in the communication module, the I/O modules provide the data related elements at the lowest hierarchical level of the linked elements providing attributes of data defined by a corresponding higher level data provision element (DO3, DO4, DO5, DO6), said higher level data provision element and corresponding function related element (LN3, LN4, LN5, LN6) are provided by the communication module and the control unit of the communication module is arranged to associate, at powering up of the device, the data provision elements (DA3, DA4, DA5, DA6) of the I/O modules with corresponding elements (LN3, LN4, LN5, LN6) associated with the function of the I/O modules in the communication module.

6. The method according to claim 5, further comprising the step of generating a device capability description file including elements of the communication standard that outline the functions, data and attributes of data corresponding to the selected hardware modules and user selected functions and data connections.

7. A computer program product provided on a data carrier for enabling selection of functions and hardware modules to be included in an intelligent electronic device to be provided in a Substation Automation or Distribution Automation system, and comprising computer program code to make a computer perform, when said code is loaded into said computer, comprising the steps of:

receiving a user selection of functions to be included in the intelligent electronic device, and receiving a user selection of data connections between the intelligent electronic device and local system equipment, characterized by the code further making the computer perform selecting mechanically separable, replaceable hardware modules to be included in the intelligent electronic device based on the received user selections, where the selected modules include a communication module for communicating with other devices of the system via a computer communication network and at least one I/O module for direct communication with local system equipment, where said communication module is provided for implementing functionality related to a communication standard, which standard provides a series of elements (LD, LN1, LN2, LN3, LN4, LN5, LN6, DO1, DO2, DO3, DO4, DO5, DO6, DA1, DA2, DA3, DA4, DA5, DA6) hierarchically linked to each other and including a device related element (LD), a number of function elements (LN1, LN2, LN3, LN4, LN5, LN6) linked to the device related element (LD) and a number of data provision elements (DO1, DO2, DO3, DO4, DO5, DO6, DA1, DA2, DA3, DA4, DA5, DA6), where the selected communication module is configured to enable inclusion of the device related element (LD) of the communication standard, function elements (LN1) associated with the function of the communication module and at least one function element (LN3, LN4, LN5, LN6) associated with functions provided by all the I/O modules selected for the device, where all selected I/O modules include data provision elements (DA3, DA4, DA5, DA6) according to the standard, where the I/O modules provide the data related elements (DA3, DA4, DA5, DA6) at the lowest hierarchical level of the linked elements providing attributes of data defined by a corresponding higher level data provision element (DO3, DO4, DO5, DO6), and all I/O modules providing data related functions include data provision elements (DA3, DA4, DA5, DA6) according to the standard and being associated with a corresponding function element (LN3, LN4, LN5, LN6) in the communication module, the I/O modules provide the data related elements at the lowest hierarchical level of the linked elements providing attributes of data defined by a corresponding higher level data provision element (DO3, DO4, DO5, DO6), said higher level data provision element and corresponding function related element (LN3, LN4, LN5, LN6) are provided by the communication module and the control unit of the communication module is arranged to associate, at powering up of the device, the data provision elements (DA3, DA4, DA5, DA6) of the I/O modules with corresponding elements (LN3, LN4, LN5, LN6) associated with the function of the I/O modules in the communication module.

8. The computer program product according to claim 7, wherein all selected I/O modules include data provision elements (DA3, DA4, DA5, DA6) according to the standard.

9. The computer program product according to claim 8, wherein the I/O modules provide the data related elements (DA3, DA4, DA5, DA6) at the lowest hierarchical level of the linked elements providing attributes of data defined by a corresponding higher level data provision element (DO3, DO4, DO5, DO6).

10. The computer program product according to claim 7, further comprising code for generating a device capability description file including elements of the communication standard that outline the functions, data and attributes of data corresponding to the selected hardware modules and user selected functions and data connections.

* * * * *